(12) United States Patent
Zhou

(10) Patent No.: US 8,655,194 B2
(45) Date of Patent: *Feb. 18, 2014

(54) METHOD FOR IMPROVING THE PERFORMANCE OF DIGITAL COHERENT OPTICAL RECEIVER USING SINGLE ENDED PHOTO-DETECTION

(75) Inventor: Xiang Zhou, Holmdel, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/566,229

(22) Filed: Aug. 3, 2012

(65) Prior Publication Data

US 2012/0294629 A1    Nov. 22, 2012

Related U.S. Application Data

(63) Continuation of application No. 12/386,837, filed on Apr. 23, 2009, now Pat. No. 8,265,491.

(60) Provisional application No. 61/192,776, filed on Sep. 22, 2008.

(51) Int. Cl.
*H04B 10/06* (2011.01)
*H04B 10/12* (2011.01)

(52) U.S. Cl.
USPC ................ 398/208; 398/202; 398/205

(58) Field of Classification Search
USPC ..................................... 398/202–214
See application file for complete search history.

(56) References Cited

U.S. PATENT DOCUMENTS

| | | | | |
|---|---|---|---|---|
| 5,463,461 | A * | 10/1995 | Horiuchi et al. | 356/484 |
| 2002/0167708 | A1 * | 11/2002 | Tsao et al. | 359/191 |
| 2005/0196176 | A1 * | 9/2005 | Sun et al. | 398/152 |
| 2006/0210211 | A1 | 9/2006 | Taylor | |
| 2007/0146179 | A1 * | 6/2007 | Batruni | 341/118 |

* cited by examiner

*Primary Examiner* — Daniel Dobson
(74) *Attorney, Agent, or Firm* — Wolff & Samson PC

(57) ABSTRACT

A method and system for mitigating distortion in coherent single-ended photo-detection is disclosed. The methodology comprises: receiving an optical signal carried on an optical transmission medium and coherently detecting the received optical signal to produce a digitized signal; estimating a time-dependent random variable introducing distortion to the coherently detected signal; and subtracting the distortion from digitized signal to produce a distortion mitigated output signal.

6 Claims, 3 Drawing Sheets

METHOD FOR IMPROVING THE PERFORMANCE OF DIGITAL COHERENT OPTICAL RECEIVER USING SINGLE ENDED PHOTO-DETECTION

CROSS-REFERENCE TO RELATED APPLICATIONS

This application is a continuation of U.S. patent application Ser. No. 12/386,837, filed on Apr. 23, 2009, which claims the benefit of U.S. Provisional Appl. Ser. No. 61/192,776, filed Sep. 22, 2008, each of which is incorporated herein by reference in their entirety.

FIELD OF THE INVENTION

The present invention relates generally to optical networks, and more particularly, to a method and device for improving the performance of a digital coherent optical receiver that utilizes single-ended photo detection.

BACKGROUND

Wave division multiplexing (WDM) optical networks are well known in the art. A WDM channel is typically transmitted by a single mode semiconductor laser. Information to be communicated is imposed on the light by modulating the laser current or by externally modulating the light by applying a voltage to a modulator coupled to the laser source. A receiver employs a photo-detector that converts the light into electric current. Typically, there are two employed methodologies for detecting the received light: direct detection and coherent detection.

Optical transmission systems impose data on the amplitude of an optical signal, where the light is switched between on and off states (i.e., "1" and "0"). In direct detection, a photo-detector receives the modulated optical signal and converts the same to an electrical signal representative of the optical power. This is typically amplified and communicated to a decision circuit that compares the signal to a reference value and outputs an unambiguous "1" or "0." One type of modulation format that encodes the data on the phase of the optical signal is known as optical differential phase keying (ODPSK). In this instance, since photo-detection does not respond to changes in phase of the incident light, a discriminator is utilized prior to the photo-detector to convert the phase changes into power values that the photo-detector can detect.

A photo-detector cannot distinguish between individual wavelengths. Therefore WDM systems employ passive filtering to separate the wavelength channels at the receiver such that each detector sees a respective channel. This consequently limits channel spacing.

Coherent detection treats optical signals in a manner analogous to RF, with response to the amplitude and phase of each wavelength. In coherent detection, an incoming optical signal is mixed with light from a local oscillator source. When the combined signals are detected by a photo-detector, the photocurrent contains a component at a frequency that is the difference between the signal frequency and the local oscillator frequency. This difference is known as an intermediate frequency and contains all the information (amplitude and phase) carried by the optical signal. Since the new carrier frequency is much lower, all information can be recovered using typical radio demodulation methodology. Coherent receivers only see signals that are close in wavelength to the local oscillator and thus by tuning the local oscillator's wavelength, a coherent receiver operates in a manner analogous to a tunable filter. Homodyne detection produces a photocurrent that is passed to a decision circuit that outputs the unambiguous "1" or "0" values. Heterodyne detection requires that the photocurrent be processed by a demodulator to recover the information from the intermediate frequency. Balanced detection replaces a 2:1 combiner with a 2:2 combiner, where each of the outputs are detected and the difference then taken by a subtracting component.

FIGS. 1 and 2 are high-level schematics of balanced photo-detection and single-ended photo-detection, respectively. In FIG. 1, a balanced photo-detection system 100 receives an incoming optical signal applied to a polarization beam splitter 102. The x-polarization is applied to a 1×4 90° phase and polarization hybrid 104a and the y-polarization to 1×4 90° phase and polarization hybrid 104b. A local oscillator (LO) 106 is coupled to a polarization beam splitter 108 such that the x-polarization is applied to hybrid 104a and the y-polarization to hybrid 104b. Each hybrid 104a, 104b has four outputs with four respective polarization states. These are received by a plurality of photo-detectors 110a and 110b, respectively, which output a corresponding photocurrent. The respective signals are 180° out of phase from each other and combined at 112a, 112b and sampled by four analog-to-digital (A/D) converters 114a, 114b, respectively. The sample values are processed by a digital signal processor (DSP) 116 to calculate the complex envelope of the signal electric field over time.

FIG. 2 illustrates a single-ended photo-detection system 200 where an incoming optical signal is applied to a polarization beam splitter 202. The x-polarization is applied to a 1×2 90° phase and polarization hybrid 204a and the y-polarization to 1×2 90° phase and polarization hybrid 204b. A LO 206 is coupled to a polarization beam splitter 208 such that the x-polarization is applied to hybrid 204a and the y-polarization to hybrid 204b. Each hybrid 204a, 204b has two outputs with two respective polarization states. The top two outputs have the local oscillator in one state of polarization (horizontal) and the lower two outputs have the local oscillator in the orthogonal state of polarization. These are received by a plurality of photo-detectors 210a and 210b, respectively, which output a corresponding photocurrent. The respective signals are 90° out of phase from each other and sampled by four analog-to-digital (A/D) converters 214a, 214b, respectively. The sample values are processed by a digital signal processor (DSP) 216.

In the expedient utilizing single-ended photo-detection such as shown in FIG. 2, only one output of the combiner is employed. Digital signal processing (DSP) based coherent optical communication provides significant performance advantages with respect to linear distortion. The aim of digital coherent detection technology is to extract both the amplitude and phase information of a modulated optical signal so that a linear digital finite impulse response (FIR) equalizer can be used to perform chromatic dispersion (CD) compensation, polarization recovery, and polarization mode dispersion (PMD) compensation in the electrical domain. As described above, typically, the optical field of the modulated signal is extracted by coherent mixing continuous wave light from a local oscillator prior to photo detection. Note that the coherent-mixed term is linearly proportional to the optical field of the original signal, but the direct square-law detection of the modulated signal will cause distortion to the extracted signal. Such distortion may severely degrade the performance of DSP-based dispersion compensation, polarization recovery and PMD compensation.

One drawback of single-ended photo-detection is the relatively high local-oscillator-to-signal power ratio (LOSPR), which can be on the order of 18 dB or more. Such a high LOSPR imposes serious constraints on receiver design. A high local oscillator power at the receiver can introduce at least a 9 dB loss by the polarization-diversity 90° hybrid. A high LOSPR also puts a more stringent requirement on the LO RIN (relative intensity noise) specification.

Accordingly, there is need in the art for a better solution to improve the performance of a digital coherent receiver using single-ended photo-detection.

SUMMARY OF THE INVENTION

In accordance with an aspect of the invention, there is provided a method for mitigating distortion in coherent single-ended photo-detection, comprising: receiving an optical signal carried on an optical transmission medium and coherently detecting the received optical signal to produce a digitized signal; estimating a time-dependent random variable introducing distortion to the coherently detected signal; and subtracting the distortion from digitized signal to produce a distortion mitigated output signal.

In accordance with another aspect of the invention, there is provided a system for mitigating distortion in coherent single-ended photo-detection, comprising: a coherent detector including a plurality of phase and polarization diverse hybrids and polarization beam splitters, photo-detectors and analog-to-digital converters, the detector configured to receive an optical signal carried on an optical transmission medium and coherently detect the received optical signal to produce a digitized signal; and a digital signal processor including a module for estimating a time-dependent random variable introducing distortion to the coherently detected signal and subtracting the distortion from digitized signal to produce a distortion mitigated output signal.

In accordance with yet another aspect of the invention, there is provided a computer-readable medium having encoded machine executable instructions that, when executed by at least one processor, causes an apparatus to mitigate distortion in coherent single-ended photo-detection by: estimating a time-dependent random variable introducing distortion to a digitized signal from a coherently detected optical signal; and subtracting the distortion from the digitized signal to produce a distortion mitigated output signal.

These aspects of the invention and further advantages thereof will become apparent to those skilled in the art as the present invention is described with particular reference to the accompanying drawings.

DETAILED DESCRIPTION OF THE PREFERRED EMBODIMENT

Figure 1:
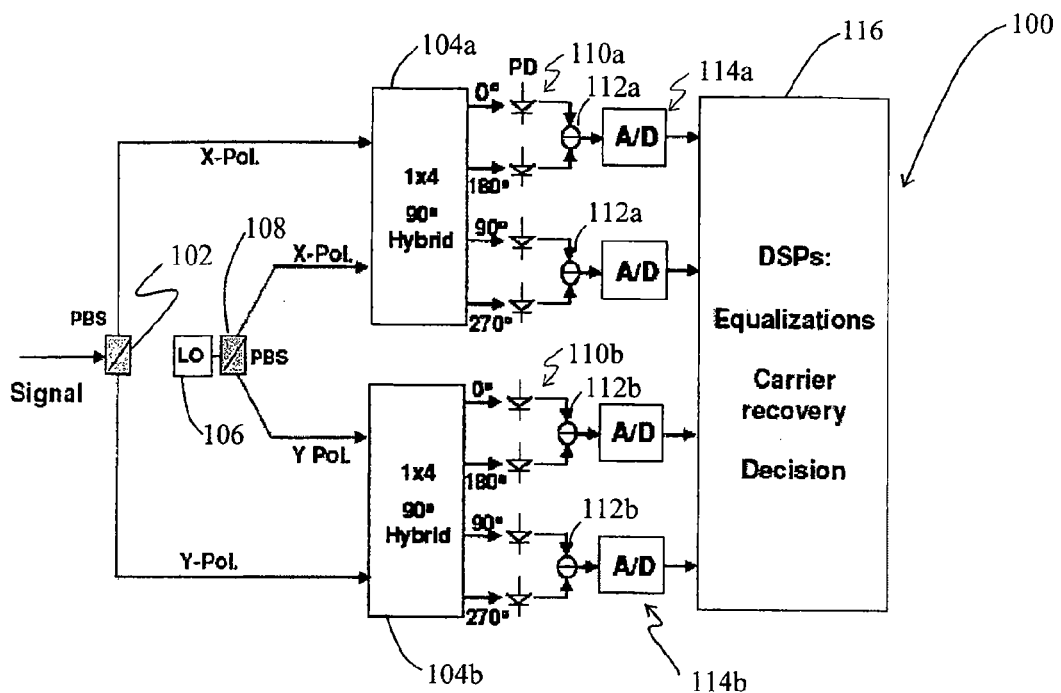
FIG. 1 is a high-level schematic of prior art balanced photo-detection in an optical communications system.

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

In accordance with an aspect of the invention, a novel DSP algorithm is employed to improve the performance of a digital coherent optical receiver using single-ended photo detection. With the digitized in-phase and quadrature components of the detected signal, the distortion due to direct square-law detection of the modulated signal can be effectively mitigated by the DSP algorithm, and therefore the allowable LOSPR can be significantly reduced in comparison to traditional methods. A lower LOSPR is much more favorable in terms of receiver design, and also helps to reduce the deleterious effects of local oscillator intensity noise.

Referring again to FIG. 2, the signal power received by the photo detectors 210a in the in-phase (0°) and quadrature branch (90°) is represented by the following equation:

$$P_I(t) = P_S(t) + P_L(t) + 2\sqrt{P_S(t)P_L(t)}\cos(\theta(t)) \quad (1)$$

$$P_Q(t) = P_S(t) + P_L(t) + 2\sqrt{P_S(t)P_L(t)}\sin(\theta(t)), \quad (2)$$

$P_S(t)$ and $P_L(t)$ denote the signal and the LO power, respectively, $\theta(t)$ represents the relative phase between the received optical signal and the reference optical signal (i.e. the LO). After photo-detection (which may be followed by a transimpedance amplifier (TIA) (not shown) and A/D conversion at 214a, 214b, the digitized electrical signal with AC coupling can be given by the following equations:

$$I_I(n) \cong \tilde{I}_S(n) + 2\sqrt{I_S(n)I_L(n)}\cos(\theta(t_n)) \quad (3)$$

$$I_Q(n) \cong \tilde{I}_S(n) + 2\sqrt{I_S(n)I_L(n)}\sin(\theta(t_n)) \quad (4)$$

$I_S(n)$ and $I_L(n)$ denote the detected (and digitized) signal and LO, respectively. $\tilde{I}_s(n)$ is the AC component of $I_s(n)$. It is an unknown time-dependent random variable introducing distortion to the coherent reception. In accordance with an aspect of the invention, the approximate value of $\tilde{I}_s(n)$ is determined as follows. If it is assumed that $I_L(n) \gg I_S(n)$, then the first-order approximation is represented by:

$$I_I(n) \approx 2\sqrt{I_S(n)I_L(n)}\cos(\theta(t_n)) \quad (5)$$

$$I_Q(n) \approx 2\sqrt{I_S(n)I_L(n)}\sin(\theta(t_n)) \quad (6)$$

From Eqns. (5) and (6) it then follows that:

$$I_I^2(n) + I_Q^2(n) \approx 4\tilde{I}_S(n)\bar{I}_L(n) + 4\bar{I}_S\bar{I}_L \quad (7)$$

$$I_I^2 + I_Q^2 = 4\bar{I}_S\bar{I}_L \quad (8)$$

$\bar{I}_S(n)$ and $\bar{I}_L(n)$ denote the DC component (i.e. time-averaged component) of $I_S(n)$ and $I_L(n)$, respectively, while $\overline{I_I^2 + I_q^2}$ denotes the DC component of $I_I^2(n) + I_q^2(n)$. To achieve (7) and (8) it is assumed that the relative intensity noise (RIN) of the CW LO is small. As a result of (7) and (8), the first-order approximation of $\tilde{I}_s(n)$ is given by:

$$\tilde{I}_S^{(1)}(n) = \frac{I_I^2(n) + I_Q^2(n) - \overline{I_I^2 + I_Q^2}}{4\bar{I}_L} \quad (9)$$

Note that $\bar{I}_L$ is a constant depending on the power of the LO and the receiver configuration. Its value can be easily ascertained by doing an initial calibration of the unit. For a typical coherent communication system with a sampling rate equal to twice of the baud/symbol rate, the known LOSPR (defined as $\overline{P_L/P_S}$) can be approximated as $\overline{I_L/I_S}$. Thus $\bar{I}_L$ can be by found by:

$$\bar{I}_L \approx \frac{\sqrt{\overline{I_I^2 + I_Q^2} \cdot LOSPR}}{2} \quad (10)$$

In order to obtain the second-order approximation of $\tilde{I}_s(n)$, the methodology replaces $I_I(n)$ and $I_Q(n)$ in (5) and (6), and thus (9) and (10) by $I_I(n) - \tilde{I}_S^{(1)}$ and $I_Q(n) - \tilde{I}_S^{(1)}$. A similar expedient can be utilized to obtain a higher-order approximation of $\tilde{I}_s(n)$.

Figure 2:
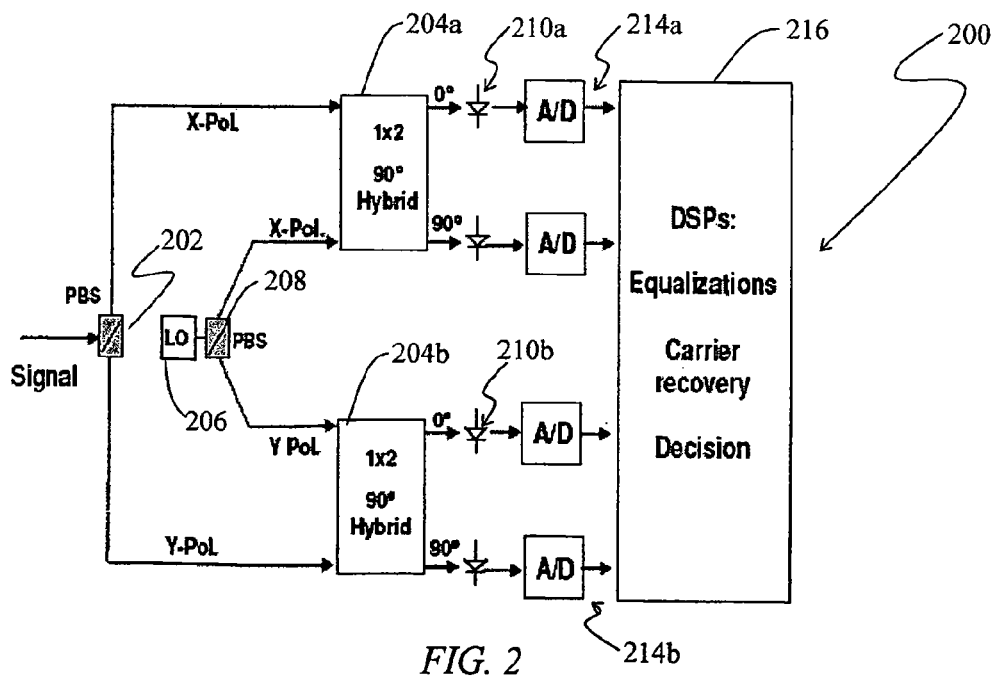
FIG. 2 is a schematic of a single-ended photo-detection system in accordance with an aspect of the present invention.
Figure 3:
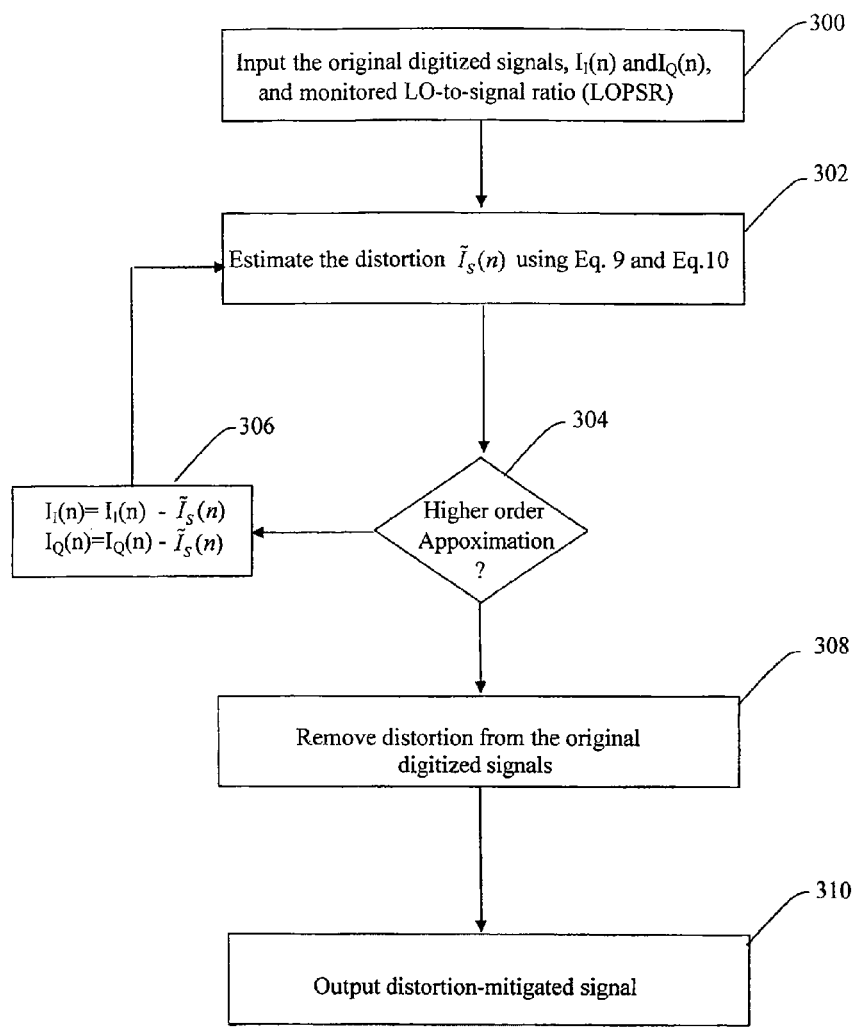
FIG. 3 is a flow-diagram of a method for mitigating distortion in a single-ended photo-detection system in accordance with an aspect of the present invention.

FIG. 3 is a flow-diagram of an illustrative method for mitigating the distortion inherent in single-ended photo-detection. In step 300, the original digitized signals $I_I(n)$ and $I_Q(n)$ and monitored LOPSR are input to a module in DSP 216 (FIG. 2). The module is configured to estimate the distortion $\tilde{I}_s(n)$ in accordance with Eqns. 9 and 10 as described in the foregoing at step 302. If a higher-order approximation is to be obtained at decision step 304, then the process jumps to step 306 where $I_I(n)$ and $I_Q(n)$ are recomputed as shown, and the estimate then updated at step 302. If there is no higher-order approximation, then the process jumps to step 308 where the distortion is removed from the original digitized signals by the DSP 216 as described above. At step 310, a distortion-mitigated signal is output from the DSP 216.

An exemplary processing module for implementing the methodology above may be hardwired in the DSP 216 or stored in a separate memory that is read into a main memory of a processor or a plurality of processors from a computer readable medium such as a ROM or other type of hard magnetic drive, optical storage, tape or flash memory. In the case of a program stored in a memory media, execution of sequences of instructions in the module causes the processor to perform the process steps described herein. The embodiments of the present invention are not limited to any specific combination of hardware and software and the computer program code required to implement the foregoing can be developed by a person of ordinary skill in the art.

The term "computer-readable medium" as employed herein refers to any machine encoded medium that provides or participates in providing instructions to the processor. Such a medium includes but is not limited to non-volatile media, volatile media and transmission media. For example, non-volatile media can include optical or magnetic memory disks. Volatile media include dynamic random access memory (DRAM), which typically constitutes the main memory. Common expedients of computer-readable media are well-known in the art and need not be described in detail here.

Figure 4A:
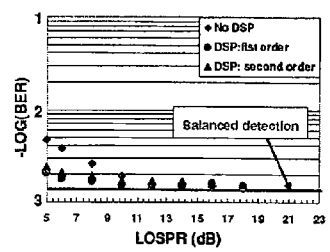
FIGS. 4a, 4b, and 4c are diagrams of simulation results.
Figure 4B:
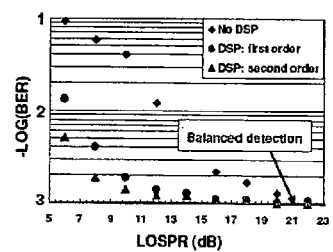
Figure 4C:
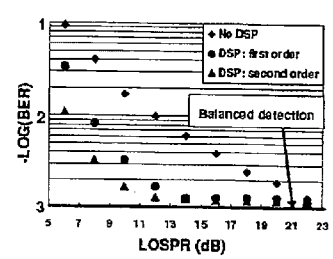

The inventor has conducted several simulations that are summarized in FIGS. 4(a)-4(c). These depict the simulated bit error rate (BER) versus LOSPR for a 114 Gb/s PolMUX-8PSK modulation format under different conditions, where the optical-to-signal-noise ratio (OSNR) is assumed to be 18 dB. In these simulations, the laser linewidth for both the optical signal and the LO are assumed to be 100 kHz, and the wavelength difference between the optical signal and the LO is 100 MHz. It is further assumed that the X and Y-polarization reference frame at the receiver is aligned to that of the transmitter. As a result, no polarization recovery is required at the receiver if there is no polarization rotator and/or PMD component introduced between the transmitter and the receiver. At the transmitter, it is further assumed that the bit/symbols between the X- and Y-polarization are aligned in the time domain. At the receiver, a two sample-per-symbol sampling rate (38 Gs/s) is employed for the A/D conversion. For DSP equalization, chromatic dispersion is compensated for with a T/2-spaced, fixed Finite Impulse Response (FIR) filter (with 156 complex-valued taps) while the polarization recovery and PMD compensation is achieved by using 4 complex-valued, 13-tap, T/2-spaced adaptive FIR filters, optimized by the CMA-LMS algorithm [see, D. N. Godard, IEEE Trans. Communications, Vol. Com-28, Nov. 11, 1980, pp. 1867-1875, which is incorporated by reference herein]. Carrier frequency and phase recovery are achieved by using a feedforward M-th power algorithm [see, A. J. Viterbi et al, IEE Trans. Info. Theory, Vol. IT-29, No. 4, July 1984, pp. 543-551, which is incorporated by reference herein]. Photo detection shot noise and electrical thermal noise are neglected in this simulation.

FIG. 4(a) shows the back-to-back results. FIG. 4(b) shows the results with 10880 ps/nm chromatic dispersion introduced between the transmitter and receiver. For the results shown in FIG. 2(c), a polarization rotator (90° around (0 1 0) at Stokes space) plus a first-order PMD emulator with DGD=100 ps and direction=(1 0 0) have been inserted between the transmitter and the receiver (no chromatic dispersion is introduced). Note that there is no CD compensation and polarization recovery requirement for the conditions of FIG. 4 (a), however, CD compensation is required for the conditions of FIG. 4(b), and polarization recovery and PMD compensation are required for conditions of FIG. 4 (c). For all the three conditions, we have given the simulated results under three process scenarios: without using the improved DSP methodology disclosed herein, and using the improved DSP methodology with both first-order and second-order approximation. For the case without using the inventive methodology, one skilled in the art will see that $\tilde{I}_s(n)$ degrades the coherent receiver performance in all the three conditions as long as the LOSPR is not large enough. The penalty caused by $\tilde{I}_s(n)$ is especially severe for the cases requiring CD compensation or polarization recovery (and PMD compensation). When the inventive methodology is employed, the penalty caused by $\tilde{I}_s(n)$ is significantly reduced by approximating $\tilde{I}_s(n)$ to the second order. To achieve performance matching balanced detection, the inventive methodology enables a coherent receiver to be operated at a significantly lower value of LOSPR (approximately 8 dB less). In real world optical networking applications, a lower LOSPR is advantageous in not only easing the requirements on receiver design, but additionally in helping to reduce the penalty from the LO relative intensity noise (RIN). It will be appreciated by those skilled in the art that the methodology disclosed herein is applicable to coherent receivers that use polarization-diversity as discussed above or coherent detection without polarization diversity. In the numerical simulation illustrated and described above, the single-carrier based PolMUX-8PSK modulation format is merely exemplary. Advantageously, the invention can be used for other single-carrier based or multi-carrier (e.g. OFDM) based modulation formats. Additionally, the invention is not limited to the field of optical networking communications, and has applications in any other field where a coherent optical receiver is used as an information receiving/detection device.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A method for mitigating distortion in coherent single-ended photo-detection comprising:
   receiving an optical signal carried on an optical transmission medium;
   coherently detecting, with single-ended photodetectors, the received optical signal to produce a digitized signal comprising in-phase and quadrature components;
   monitoring a local-oscillator-to-signal power ratio;
   estimating, as a function of the in-phase and quadrature components and the local-oscillator-to-signal power ratio, a time-dependent random variable introducing distortion to the coherently detected optical signal; and
   subtracting the distortion from the digitized signal to produce a distortion mitigated output signal.

2. The method according to claim 1, wherein signal power received by the single-ended photo-detectors in the coherent detection is represented by:

$$P_I(t) = P_S(t) + P_L(t) + 2\sqrt{P_S(t)P_L(t)}\cos(\theta(t))$$

$$P_Q(t) = P_S(t) + P_L(t) + 2\sqrt{P_S(t)P_L(t)}\sin(\theta(t))$$

wherein $P_S(t)$ denotes the signal power and $P_L(t)$ denotes local oscillator power of a reference optical signal, and $\theta(t)$ represents a relative phase between the received optical signal and the reference optical signal, and further, wherein a digitized signal with AC coupling is represented by:

$$I_I(n) \cong \tilde{I}_S(n) + 2\sqrt{I_S(n)I_L(n)}\cos(\theta(t_n))$$

$$I_Q(n) \cong \tilde{I}_S(n) + 2\sqrt{I_S(n)I_L(n)}\sin(\theta(t_n))$$

and $I_s(n)$ denotes the coherently detected signal and $I_L(n)$ denotes a local oscillator signal, and $\tilde{I}_s(n)$ is the time-dependent random variable introducing distortion.

3. A system for mitigating distortion in coherent single-ended photo-detection, comprising:
   a coherent detector including a plurality of phase and polarization diverse hybrids and polarization beam splitters, single-ended photo-detectors and analog-to-digital converters, the detector configured to receive an optical signal carried on an optical transmission medium and coherently detect the received optical signal to produce a digitized signal comprising in-phase and quadrature components; and
   a processor for monitoring a local-oscillator-to-signal power ratio, for estimating, as a function of the in-phase and quadrature components and the local-oscillator-to-signal power ratio, a time-dependent random variable introducing distortion to the coherently detected signal and for subtracting the distortion from the digitized signal to produce a distortion mitigated output signal.

4. The system according to claim 3, wherein signal power received by the single-ended photo-detectors is represented by:

$$P_I(t) = P_S(t) + P_L(t) + 2\sqrt{P_S(t)P_L(t)}\cos(\theta(t))$$

$$P_Q(t) = P_S(t) + P_L(t) + 2\sqrt{P_S(t)P_L(t)}\sin(\theta(t))$$

wherein $P_S(t)$ denotes the signal power and $P_L(t)$ denotes local oscillator power of a reference optical signal, and $\theta(t)$ represents a relative phase between the received optical signal and the reference optical signal, and further, wherein a digitized electrical signal with AC coupling is represented by:

$$I_I(n) \cong \tilde{I}_S(n) + 2\sqrt{I_S(n)I_L(n)}\cos(\theta(t_n))$$

$$I_Q(n) \cong \tilde{I}_S(n) + 2\sqrt{I_S(n)I_L(n)}\sin(\theta(t_n))$$

and $I_s(n)$ denotes the coherently detected signal and $I_L(n)$ denotes a local oscillator signal, and $\tilde{I}_s(n)$ is the time-dependent random variable introducing distortion.

5. A tangible computer-readable medium having encoded machine executable instructions that, when executed by a processor, causes an apparatus to mitigate distortion in coherent single-ended photo-detection by:
   receiving an optical signal carried on an optical transmission medium and coherently detecting, with single-ended photodetectors, the received optical signal to produce a digitized signal comprising in-phase and quadrature components;
   monitoring a local-oscillator-to-signal power ratio;
   estimating, as a function of the in-phase and quadrature components and the local-oscillator-to-signal power ratio, a time-dependent random variable introducing distortion to the coherently detected signal; and
   subtracting the distortion from the digitized signal to produce a distortion mitigated output signal.

6. The tangible computer-readable medium according to claim 5, wherein signal power received by single-ended photo-detectors in the coherent detection is represented by:

$$P_I(t) = P_S(t) + P_L(t) + 2\sqrt{P_S(t)P_L(t)}\cos(\theta(t))$$

$$P_Q(t) = P_S(t) + P_L(t) + 2\sqrt{P_S(t)P_L(t)}\sin(\theta(t))$$

wherein $P_S(t)$ denotes the signal power and $P_L(t)$ denotes local oscillator power of a reference optical signal, and $\theta(t)$ represents a relative phase between the received optical signal and the reference optical signal, and further, wherein a digitized electrical signal with AC coupling is represented by:

$$I_I(n) \cong \tilde{I}_S(n) + 2\sqrt{I_S(n)I_L(n)} \cos(\theta(t_n))$$

$$I_Q(n) \cong \tilde{I}_S(n) + 2\sqrt{I_S(n)I_L(n)} \sin(\theta(t_n))$$

and $I_S(n)$ denotes the coherently detected signal and $I_L(n)$ denotes a local oscillator signal, and $\tilde{I}_S(n)$ is the time-dependent random variable introducing distortion.

* * * * *